United States Patent [19]
Favstritsky et al.

[11] Patent Number: 4,892,892
[45] Date of Patent: Jan. 9, 1990

[54] FLAME RETARDANT POLYURETHANE FOAM COMPOSITIONS CONTAINING POLYNUCLEARBROMINATED ALKYLBENZENE

[75] Inventors: Nicolai A. Favstritsky, Lafayette; Richard S. Rose; Dennis M. Borden, both of West Lafayette; David J. Honkomp, Lafayette, all of Ind.

[73] Assignee: Great Lakes Chemical Corporation, West Lafayette, Ind.

[21] Appl. No.: 107,627

[22] Filed: Oct. 9, 1987

[51] Int. Cl.$^4$ ................................................ C08J 9/00
[52] U.S. Cl. ..................... 521/107; 521/131; 521/132
[58] Field of Search ............... 521/85, 98, 906, 131, 521/132, 107

[56] References Cited

U.S. PATENT DOCUMENTS

| | | | |
|---|---|---|---|
| 3,457,204 | 7/1969 | Burger et al. | 521/139 |
| 3,817,912 | 6/1974 | Diebel et al. | 521/98 |
| 3,850,882 | 11/1974 | Underwood et al. | 524/430 |
| 3,901,834 | 8/1975 | Brackenridge | 521/132 |
| 3,916,016 | 10/1975 | Howell et al. | 521/98 |
| 3,920,606 | 11/1975 | Diebel et al. | 521/98 |
| 4,012,343 | 3/1977 | Raley Jr. | 521/85 |
| 4,129,551 | 12/1978 | Rueter et al. | 524/139 |
| 4,154,712 | 5/1979 | Lee | 524/141 |
| 4,166,161 | 8/1979 | Noetzel | 521/98 |
| 4,172,826 | 10/1979 | Haaf et al. | 524/141 |
| 4,178,409 | 12/1979 | Tomita | 521/906 |
| 4,277,567 | 7/1981 | Keyworth et al. | 521/98 |
| 4,355,126 | 10/1982 | Haaf et al. | 524/411 |
| 4,388,429 | 6/1983 | Ilardo et al. | 524/94 |
| 4,587,273 | 5/1986 | Shimomura | 521/906 |
| 4,717,509 | 1/1988 | Buttgens et al. | 521/906 |

FOREIGN PATENT DOCUMENTS 3005477 8/1981 Fed. Rep. of Germany .
1049399 11/1966 United Kingdom .
1121736 7/1968 United Kingdom .

OTHER PUBLICATIONS

R. S. Rose and K. A. Hughes (Journal of Flame Retardant Chemistry, 9 155 [1982].

*Primary Examiner*—Morton Foelak
*Assistant Examiner*—Dennis R. Daley
*Attorney, Agent, or Firm*—Kirkland & Ellis

[57] ABSTRACT

Flame retardant polyurethane foam compositions incorporate an effective amount of a polybrominated higher alkylbenzene as a flame retardant and, optionally, a polyaryl phosphate agent.

9 Claims, No Drawings

FLAME RETARDANT POLYURETHANE FOAM COMPOSITIONS CONTAINING POLYNUCLEARBROMINATED ALKYLBENZENE

BACKGROUND OF THE INVENTION

1. Field of Invention

This invention relates to polyurethane foams having improved resistance to scorch, smoldering, and hydrolysis and, in particular, it relates to polyurethane foams incorporating polybrominated higher alkylbenzenes and, optionally, triaryl phosphate flame retardants.

2. Description of Prior Art

Polyurethane foams are used primarily for insulation and cushioning. Since they are thermoset polymers, additives such as flame retardants are generally incorporated during polymerization. Equipment for producing polyurethane foams is generally designed to handle liquids, discouraging the use of solid flame retardant additives.

Traditionally, most flame retardants, although efficient in their function of retarding open flame combustion in a polyurethane foam, promote smolder, thermal degradation (scorch), and hydrolysis. It is essential that one or more of these tendencies be minimized in certain foam types or in certain applications areas.

This is particularly true of polyurethane foam produced from polyester polyols. These polyols tend to degrade under humid conditions and to degrade quickly when thermal decomposition or hydrolysis products of flame retardants are present. It is also true that polyurethane foams for certain applications, such as used in furniture sold in the State of California, need to be resistant to smoldering ignition due to contact with a cigarette or other ignition source. In addition in the case of polyester-based polyurethane foams, hydrolytic stability of additives is another important criterion which must be met.

The problems of scorch, smolder and hydrolysis have been addressed in the art. R. S. Rose and K. A. Hughes (Journal of Fire Retardant Chemistry, 9 155 [1982]) have shown that aromatic bromine compounds such as pentabromodiphenyl oxide tend to resist both scorch and smoldering. Pentabromodiphenyl oxide based flame retardants have gained acceptance as flame retardants for polyurethane foams due in part to the relative stability of aromatically bound bromine and its resistance to thermal and hydrolytic degradation. Although pentabromodiphenyl oxide is thus used, its high viscosity, its tendency to solidify with time, and its unknown decomposition products have limited its use.

Aromatic phosphate esters have been used for some time in conjunction with brominated diphenyl oxides as diluents and/or auxiliary flame retardants. However, these compounds are not as effective as halogen-containing flame retardants.

Underwood, et al. U. S. Pat. No. 3,850,882 discloses a three-component flame retardant additive system for polyolefins, especially polypropylene, consisting of
(a) a halogenated alkylbenzene of the formula

where X may be Cl or Br: and Y is a hydrocarbon of 1-20 carbon atoms; a is an integer from 0 to 3; and n is an integer from 3 to 6.
(b) stannic oxide:
(c) a bis-phenylalkylene hydrocarbon.

The patent does not suggest that such a flame retardant mixture has any utility in polyurethane foams, let alone that the halogenated alkylbenzene would have any such use.

Rueter, et al. U.S. Pat. No. 4,129,551 discloses nonflammable polyester compositions incorporating a phosphorus-containing, multiple component flame retardant additive consisting of:
(a) a triarylphosphine oxide or an aryl or alkyl ester of an arylphosphinic acid;
(b) a nuclear brominated alkylbenzene; and
(c) customary auxiliary agents and additives.

Polyester compositions based on such agents contain 0.5–10% by weight of bromine and 0.1–2% by weight of phosphorus. Among the nuclear brominated alkylbenzenes described were a compound of the following formula:

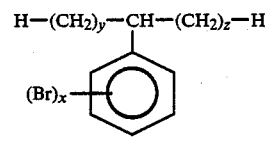

where x=2 to 5, y and z each are zero or an integer from 1 to 17 and sum of y+z is an integer between 7 and 17.

Mixtures of such agents are also suggested. There is no disclosure that the additive mixture has any utility in polyurethane foams or that the nuclear brominated alkylbenzene may be so-used alone for that or any other purpose.

Therefore, it is a principal object of this invention to provide flame retardant polyurethane foam compositions that do not exhibit scorching or smoldering problems and that exhibit increased hydrolytic stability.

Another objective of this invention is to provide polyether and polyester type polyurethane foams incorporating a superior flame retardant agent.

Yet a further object is to utilize polybrominated higher alkylbenzenes as flame retardant additives in polyether and polyester type polyurethane foams compositions.

SUMMARY OF THE INVENTION

The foregoing and other objects, advantages, and features of the subject invention may be obtained with flame retarded polyurethane foam compositions based on polyester or polyether type polyols incorporating an effective amount of a polybrominated higher alkylbenzene flame retardant and, optionally, a polyaryl phosphate. More particularly, the polyurethane foams incorporate an effective amount of a polybrominated higher ($C_{6-18}$) mono- or di-alkylbenzene and, optionally, a di- or tri-aryl phosphate. Preferably, the polybrominated alkylbenzenes utilized in accordance with this invention include tetra- and penta-bromo secondary and tertiary alkylbenzenes, wherein the alkyl group contains 6-18 carbon atoms, and tri- and tetra-bromo secondary and tertiary dialkylbenzenes, wherein the alkyl groups contain 6-18 carbon atoms.

The compositions of this invention preferably comprise about 50 to 90 percent polyurethane foam, about 1 to 25 percent polybrominated higher alkylbenzene, and, optionally, up to about 25 percent polyaryl phosphate by weight of the composition.

DETAILED DESCRIPTION OF THE PREFERRED EMBODIMENTS.

In accordance with this invention, it has been discovered that polybrominated higher alkylbenzenes may be used to flame retard polyurethane foams. The term "higher", as used herein with respect to polybrominated higher alkylbenzenes, is intended to include secondary and tertiary alkylbenzenes and mixtures thereof.

More particularly, polybrominated higher alkylbenzenes are useful in the preparation of flame retardant polyurethane foams in accordance with procedures known in the art. The novel compositions of this invention are distinguished from known flame retardant polyurethane foam compositions by improved properties.

Preferred novel flame retardant polyurethane foam compositions may be prepared by admixing from about 50% to about 90% by weight polyurethane foam components: and from about 1% to about 25% by weight polybrominated higher alkylbenzene, where the percentages are based on the total weight of the resulting admixture of these components.

The preferred composition is from about 5% to about 15% polybrominated higher alkylbenzene. In addition, the polybrominated higher alkylbenzene may optionally be blended with up to about 25% by weight of a polyaryl phosphate ester, including triaryl phosphates and alkyl diaryl phosphates. Triaryl phosphate esters are preferred, with triaryl phosphate esters of the alkylphenyl diphenyl phosphate type such as cresyl diphenyl phosphate, isopropylphenyl diphenyl phosphate or t-butylphenyl diphenyl phosphate, for example, being especially preferred. Triaryl phosphates such as triphenyl phosphate and tricresyl phosphate may also be employed. Suitable alkyl diaryl phosphates include 2-ethylhexyl diphenyl phosphate.

This invention is directed towards polyurethane foams which can be prepared from polyether and polyester polyols, isocyanates such as, toluene diisocyanate and/or polymethylene polyphenyl diisocyanate, and additives normally used in the preparation of polyurethane foams. The polybrominated alkylbenzenes desirably are provided in admixture with about 0-25% by weight polyaryl phosphate additives to achieve the desired levels of flame retardance.

Applications for the polyurethane foam of the invention include but are not exclusive to furniture, bedding, automotive, carpet underlay and packaging which must meet specific flammability requirements such as California Bureau of Home Furnishings Bulletin 117, Motor Vehicle Safety Standard 302, and U.L. 94 Horizontal Burn Test, among others.

The polybrominated alkylbenzenes of this invention exhibit volatilities and thermal stabilities that permit them to be used effectively in urethane foams. Additionally, by virtue of their composition, polybrominated alkylbenzenes are hydrolytically stable, which makes them advantageous as additives for polyester-based polyurethane foams, where hydrolytic stability is of great importance.

The polybrominated higher alkylbenzene flame retardant additives utilized in accordance with the present invention are nuclear halogenated aromatic compounds of the generalized structures (I) and (II):

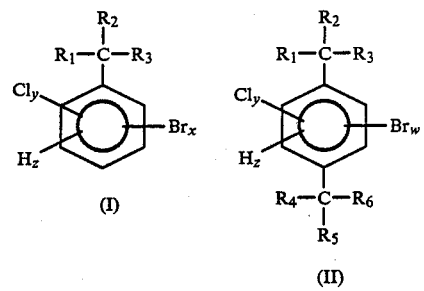

wherein x is 4 or 5, y is zero or 1, z is zero or 1, w is 2 to 4, $R_1$ and $R_2$ are hydrogen or methyl, and $R_2$ $R_3$ $R_5$ $R_6$ are alkyl ranging independently from 1 to 16 carbon atoms. Also, numerically combining $R_1$ $R_2$ and $R_3$ or $R_4$ $R_5$ and $R_6$, the total number of carbon atoms ranges from 5 to 17. Mixtures of such compounds may be produced and are especially preferred.

Compounds of structure (I) are tetra- and penta-halo secondary or tertiary alkylbenzenes, wherein the alkyl group is of 6 to 18 carbon atoms. Compound of structure (II) are tri- and tetra-halo secondary or tertiary dialkylbenzenes wherein the alkyl group has 6 to 18 carbon atoms.

Preferred compounds produced in accordance with this invention are secondary and tertiary decyl, undecyl, dodecyl, tridecyl and tetradecyl benzenes containing 4 to 5 bromines on the benzene nucleus. In place of individual compounds, it is especially preferred to employ mixtures of such compounds. In general, pure brominated primary alkylbenzenes are solids. However, mixtures of brominated secondary and tertiary alkylbenzenes are liquids having a broader range of uses due to their liquid state. The polybrominated, predominately secondary and tertiary alkyl- and dialkyl benzenes produced in accordance with this invention generally have a bromine content between 30% and 70% and a chlorine content between 0% and 10%, by weight.

The polybrominated alkylbenzenes of this invention are produced by the direct bromination of the corresponding unbrominated material using an excess of liquid bromine as the reaction medium, using bromine chloride as the brominating agent, and using an antimony halide catalysts described in Favstritsky, et al. copending United States Patent entitled "Process for Producing Polybrominated Higher Alkylbenzenes", filed herewith.

As noted above, it is preferred to utilize mixtures of individual polybrominated benzenes in accordance with this invention, and these mixtures may be derived from mixtures of the corresponding alkyl benzenes. The mixtures of individual polybrominated alkyl benzenes that are most preferred are so-preferred for the additional reason that the corresponding hydrocarbon mixtures are readily available intermediates in the detergent industry.

Especially preferred polybrominated alkylbenzenes in accordance with this invention are the tetra and penta bromo derivatives of secondary, straight chain alkylbenzenes of the structure (III):

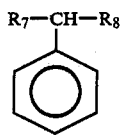
(III)

wherein $R_7$ and $R_8$ are independently linear alkyl groups containing 1 to 12 carbon atoms and where, when numerically combined, $R_7$ and $R_8$ contain between 9 and 13 carbon atoms, primarily 9 and 11 carbon atoms and where $R_7$ is about 25 to 35% methyl. Such a secondary, straight chain alkylbenzene is commercially available from Monsanto Co. under the trademark "DODANE S," which is a mixture of secondary monoalkylbenzenes, wherein the alkyl is primarily undecyl and dodecyl.

Another preferred polybrominated alkylbenzene is derived from a secondary, straight chain alkylbenzene of formula (III), wherein the numerical combination of $R_7$ and $R_8$ is between 9 and 11 carbon atoms and where $R_7$ is about 10 to 15% methyl. Such a preferred alkylbenzene is commercially available from Monsanato Co. under the trademark "ALKYLATE 215", which is a mixture of secondary monoalkylbenzenes similar to "DODANE S".

Still another preferred polybrominated alkyl benzene is derived from a tertiary, branched chain alkylbenzene of the formula (IV):

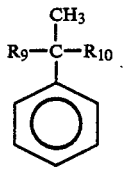
(IV)

wherein $R_9$ and $R_{10}$ are independently alkyl groups containing 1 to 9 carbon $R_9$ and $R_{10}$ carbon atoms and where the numerical combination of $R_9$ and $R_{10}$ is primarily 8 to 11 carbon atoms. Such a tertiary alkyl benzene, in which $R_9$ and $R_{10}$ are typically nonlinear alkyl groups, is commercially available from Monsanto Co. under the trademark "DODANE H", which is a mixture of tertiary branched chain, monoalkylbenzenes, wherein alkyl is primarily dodecyl.

Still another preferred polybrominated alkylbenzene is derived from a secondary, straight chain dialkylbenzene of the formula (V)

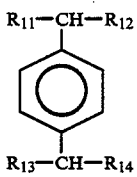
(V)

wherein $R_{11}$, $R_{12}$, $R_{13}$, and $R_{14}$ are independently linear alkyl groups containing 1 to 10 carbon atoms and where, when numerically combined, $R_{11}$ and $R_{12}$ or $R_{13}$ and $R_{14}$ contain primarily 11 carbon atoms. Such a material, in which parasubstitution predominates and which contains up to 10% monoalkybenzenes, is commercially available from Pilot Chemical Co. under the trademark "ARISTOL E", which is a mixture of secondary dialkyl benzenes where in alkyl is primarily dodecyl. Other commercially available alkylbenzenes may, of course, also be brominated and then employed in accordance with the present invention.

The brominated alkylbenzenes of the present invention are a high boiling liquids, nonvolatile, thermally stable, hydrolytically stable and flame resistant. They may be incorporated in polyurethane foam compositions of this invention during formulation as is known to those skilled in the art.

The scope of the present invention includes the incorporation of other additives in the composition so far as to affect a particular end result. Such additives include, without limitation, heat stabilizers, other flame retardants, light stabilizers, plasticizers, pigments, preservatives, ultraviolet stabilizers, fillers, antioxidants, antistatic agents, and other materials well known to those skilled in the art, for example, as described in Modern Plastic Encyclopedia, Vol. 63, No. 10A, McGraw-Hill, Inc. (1986).

The above described other additive materials which may be employed in the composition of this invention can be utilized in any amounts which will not substantially adversely affect the properties of the composition. In general, such amount will be from about 0% to about 80%, based on the total weight of the composition.

Polybrominated alkylbenzenes represent an improvement over prior art diphenyl oxide based flame retardants for polyurethane foams for several reasons while retaining the important advantages. Polybrominated alkylbenzenes are inherently liquid. Their viscosity can be controlled by altering the alkyl chain. Feedstocks for bromination are more plentiful, varied and inexpensive compared to diphenyl oxide. The lack of a phenolic oxygen reduces the need for toxicity testing and eliminates a possible site for chemical attack or degradation. At the same time, the benefits of aromatic bromine are retained in an enhanced form.

EXAMPLES

The following preparations and examples are given to illustrate the invention and should not be construed as limiting its scope. All parts are given by weight unless otherwise indicated.

Polybrominated primarily dodecylbenzenes were prepared by the procedure disclosed in the examples of copending Favstritsky, et al. United Stated Patent Application entitled "Process for Producing Polybrominated Higher Alkylbenzenes." The samples of polybrominated alkylbenzenes used in the following examples were prepared by brominating DODANE S, and contained approximately 60% bromine (prepared by the method in Example 1 of the aforementioned copending application). This material was noticeably more effective as a flame retardant than materials with lower bromine content and is preferred in accordance with this invention. Blending the polybrominated higher alkylbenzenes with triaryl phosphates is also preferred.

EXAMPLE I

Flexible polyurethane foam was prepared using the following formulation containing a polyether polyol. The flame retardant content of each foam is listed below the formulation. This foam is typical of that used for furniture and bedding applications.

Two different flame retardants were incorporated in these formulations. The first is a polybrominated primarily dodecyl benzene containing about 60 percent bromine (identified as compound A2 in the Table below) and the second is a triaryl phosphate (cresyl diphenyl phosphate). In addition, as a control sample, foam without any flame retardant was prepared. An attempt to formulate another comparative sample incorporating the 16 parts cresyl diphenyl phosphate was unsuccessful because a foam could not be formed with satisfactory physical properties.

The samples were tested for flame retardancy in accordance with the procedure established in Part A of the California Bulletin 117 Test. The formulations and the results are given in Tables I and II.

TABLE I

| Foam Formulation | Parts |
|---|---|
| Polyether Polyol (Dow Chemical Voranol 3010) | 100.00 |
| Water | 4.5 |
| Amine Catalyst (Abbott Labs Polycat 70) | 0.28 |
| Tin Catalyst (M & T T-10) | 0.32 |
| Silicone Surfactant (Union Carbide L-5810) | 1.0 |
| Toluene Diisocyanate | 57.45 |
| Fluorocarbon 11 | 4 or 9 (with flame retardant) |
| Flame Retardant | Varied |

TABLE II

CAL 117 Flammability*

| Sample Number | Flame Retardant | Density | Avg. Burn Time | |
|---|---|---|---|---|
| 1 | None | 1.41 lb/ft$^3$ | 25 seconds | fail |
| 2 | 16 parts A2 | 1.38 | 0.5 seconds | fail |
| 3 | 16 parts A2 | 1.50 | 0.3 seconds | pass |
| 4 | 16 parts 80/20 A2/Triaryl phosphate | 1.40 | 0.8 seconds | Pass |

*Test employed is a part A California Bulletin 117 Test.

EXAMPLE II

Samples of flexible polyurethane foam were prepared using the following formulation containing a polyester polyol. The flame retardant content of each foam and the test data are given in Tables III and IV. This foam is typical of that used in automotive applications. The samples were tested in accordance with Motor vehicle Safety Standard 302.

TABLE III

| Foam Formulation | Parts |
|---|---|
| Polyester polyol (Witco Fomrez 53) | 100 |
| Water | 4.0 |
| N—Ethyl Morpholine | 0.65 or 0.70* |
| Silicone Surfactant (Union Carbide L-536) | 1.10 or 1.4* |
| Tin Catalyst (M & T T-10) | 0.15 or 0.2* |
| Toluene Diisocyanate | 50.37 |
| Flame Retardant | Varied |

*with Flame Retardant

TABLE IV

MVSS-302 Flammability**

| Sample Number | Flame Retardant | Density | Avg. Burn Time | |
|---|---|---|---|---|
| 1 | None | 2.1 lb/ft$^3$ | 166.2 seconds | fail |
| 2 | 9 parts A2 | 2.3 | 0 | pass |
| 3 | 9 parts 4:1 A2/Triaryl phosphate | 2.4 | 0 | pass |

**Tested per Motor Vehicle Safety Standard 302.

Hydrolytic stability testing was carried out with polyester-based foam prepared from the above formulation. The loss of tensile strength over time at 200° F. and 100% relative humidity was the criteria used for measuring hydrolysis resistance The test data are reported in Table V.

TABLE V

| Sample Number | Flame Retardant | Density | 0 | 1 | 2 | 3 | 4 | 5 |
|---|---|---|---|---|---|---|---|---|
| 1 | None | 2.0 lbs./ft.$^3$ | 21 | 20 | 14 | 7 | 3 | 1.5 |
| 2 | 11 Parts 4:1 A2/triaryl phosphate | 2.2 | 23 | 20 | 22 | 19 | 15 | 7 |

The data reported in Tables I, II, and III demonstrate that the polybrominated higher alkylbenzenes of this invention are effective flame retardant agents for polyurethane foams based on polyester and polyether-type polyols, especially in combination with polyayl phosphates.

We claim:

1. A flame retardant polyurethane foam composition comprising:
    a polyurethane foam; and
    as a flame retardant agent, an effective amount of a liquid polynuclearbrominated higher $C_{6-18}$ alkylbenzene containing about 30–70 percent bromine by weight of the agent, with or without a polyaryl phosphate.

2. A composition, as claimed in claim 1, wherein the polyaryl phosphate is a triaryl phosphate.

3. A composition, as claimed in claim 1, wherein the polyurethane foam is based on a polyether polyol and the composition comprises a polyaryl phosphate.

4. A composition, as claimed in claim 1, wherein the polybrominated higher alkylbenzene is a compound of the structure:

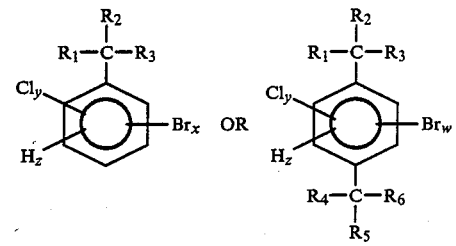

wherein X is 3, 4 or 5, y is zero or 1, Z is zero or 1, w is 2 to 4; where $R_1$ and $R_4$ are hydrogen or methyl, and $R_2$, $R_3$, $R_5$, $R_6$ are alkyl groups ranging independently from 1 to 16 carbon atoms and where the total number of carbon atoms in each of ($R_1$ $R_2$ and $R_3$) and ($R_4$, $R_5$ and $R_6$) ranges from 5 to 17.

5. A composition, as claimed in claim 4, wherein the polybrominated predominantly secondary alkylbenzene is a tetra- or penta-bromo secondary $C_{6-18}$ alkylbenzene.

6. A composition, as claimed in claim 4, wherein the polybrominated higher alkylbenzene is a tri- or tetra-bromo secondary or tertiary di-$C_{6-18}$-alkylbenzene.

7. A composition, as claimed in claims 5 or 6, wherein the alkyl groups are a mixture of $C_{10-12}$ alkyl groups.

8. A composition, as claimed in claims 5 or 6, wherein the polybrominated alkylbenzene is a liquid mixture of $C_{10-12}$ tetra- and penta-bromoalkylbenzenes.

9. A composition, as claimed in claim 1, wherein the composition comprises about 50 to 90 percent polyurethane foam, about 1 to 25 percent polybrominated higher alkylbenzene, and about 0 to 25 percent triaryl phosphate, all by weight of the flame retardant polyurethane foam composition.

* * * * *

UNITED STATES PATENT AND TRADEMARK OFFICE
CERTIFICATE OF CORRECTION

PATENT NO. : 4,892,892

DATED : January 9, 1990

INVENTOR(S) : Nicolai A. Favstritsky, et al

It is certified that error appears in the above-identified patent and that said Letters Patent is hereby corrected as shown below:

Col. 2, line 1, delete the colon after BR ":" and substitute therefore a semicolon --;--.

Col. 3, line 25, delete the colon after components ":" and substitute therefore a semicolon --;--.

Col. 4, line 17, delete after the first and connector "$R_2$" and substitute therefore --"$R_4$"--.

Col. 7, line 43, delete after the term Motor "vehicle" and substitute therefore --"Vehicle"--.

Col. 7, line 54, at the lefthand margin insert --"Results"--.

Col. 8, line 1, insert a period --"."-- after the term resistance.

Col. 8, line 15, delete after the term with "polyayl" and substitute therefore --"polyaryl"--.

UNITED STATES PATENT AND TRADEMARK OFFICE
CERTIFICATE OF CORRECTION

PATENT NO. : 4,892,892

DATED : January 9, 1990

INVENTOR(S) : Nicolai A. Favstritsky, et al

It is certified that error appears in the above-identified patent and that said Letters Patent is hereby corrected as shown below:

Col. 5, line 23, delete after the term from "Monsanato" and substitute therefore --"Monsanto"--.

Col. 6, line 47, delete after the term United "Stated" and substitute therefore --"States"--.

Signed and Sealed this

Twenty-sixth Day of February, 1991

Attest:

HARRY F. MANBECK, JR.

*Attesting Officer*      *Commissioner of Patents and Trademarks*